United States Patent [19]

Issa

[11] Patent Number: 4,553,127
[45] Date of Patent: Nov. 12, 1985

[54] BATTERY LOCK ANTI-THEFT SYSTEM

[76] Inventor: Darrell E. Issa, 7544 Richmond Rd., Oakwood Village, Ohio 44146

[21] Appl. No.: 509,333

[22] Filed: Jun. 30, 1983

[51] Int. Cl.[4] ............................................. B60R 25/04
[52] U.S. Cl. ................................ 340/64; 307/10 AT; 307/10 BP; 180/287
[58] Field of Search .................... 123/198 B, 198 DE; 180/287, 289; 200/43; 307/10 AT, 10 BP; 340/64, 636, 652, 825.31, 825.34, 825.5; 429/7; 320/2, 35

[56] References Cited

U.S. PATENT DOCUMENTS

| | | |
|---|---|---|
| 1,654,450 | 12/1927 | Blake . |
| 3,274,477 | 9/1966 | Boyes . |
| 3,430,058 | 2/1969 | Yoshida . |
| 3,535,899 | 10/1970 | Gardner et al. . |
| 3,553,641 | 1/1971 | Moragne . |
| 3,634,724 | 1/1972 | Vest . |
| 3,692,965 | 9/1972 | Gardner . |
| 3,885,164 | 5/1975 | Vest . |
| 4,102,164 | 7/1978 | Barbush . |
| 4,110,734 | 8/1978 | Lepore et al. . |
| 4,141,332 | 2/1979 | Wyler ............................. 123/198 B |
| 4,176,284 | 11/1979 | Higgs ............................. 307/10 BP |
| 4,207,850 | 6/1980 | Wharton . |
| 4,209,709 | 6/1980 | Betton .................................... 340/64 |
| 4,317,108 | 2/1982 | Schwartz ............................. 340/64 |
| 4,342,024 | 7/1982 | Rossi .................................... 340/64 |
| 4,431,713 | 2/1984 | Fehling ................................. 429/7 |
| 4,438,426 | 3/1984 | Adkins ................................. 340/64 |

FOREIGN PATENT DOCUMENTS 10084 4/1980 European Pat. Off. .............. 340/64

Primary Examiner—John W. Caldwell, Sr.
Assistant Examiner—Michael F. Heim
Attorney, Agent, or Firm—Fay, Sharpe, Fagan Minnich & McKee

[57] ABSTRACT

A vehicle includes a rechargeable battery (A) having positive and negative terminals (18, 20). A wiring system (B) connects the battery with various electrical devices of the automobile including a starter motor (92). An access control circuit (C) selectively controls the passage of electric power from the battery to the wiring system. The access control circuit includes a current limiting circuit (70) for limiting the passage of current to a first current level which is insufficient to operate the starter motor and a high level current passing circuit (60) for passing current at a second level which is sufficiently high to operate the starter motor. A current level selection circuit (80) selectively enables the current limiting circuit and the high level current passing circuit to pass current from the battery to the electrical wiring system at one of the first and second levels. In this manner, when limited current is passed to the wiring system, substantially all vehicular electric devices operate normally. However, because the starter motor receives insufficient current to operate normally, the battery will appear low or dead to one attempting to start the car without causing the current level selection circuit to enable the high level current passing means to pass current to the starting motor. The access control circuit may be disposed within the battery (FIG. 1), be attached to at least one battery terminal (FIGS. 2 and 3), or be otherwise connected between the battery and the starter motor.

18 Claims, 8 Drawing Figures

BATTERY LOCK ANTI-THEFT SYSTEM

BACKGROUND OF THE INVENTION

This application pertains to the art of access control systems for controlling access to motorized apparatus. The invention finds particular application in anti-theft systems for automobiles, trucks, and other motor vehicles and will be described with particular reference thereto. It is to be appreciated, however, that the invention has other applications including limiting access to selected users, controlling access to electric vehicles, heavy equipment, stationary machinery, and the like.

Heretofore, various types of anti-theft systems have been utilized in motor vehicles. Many prior art anti-theft systems included an ignition control device or normally open switch for selectively permitting and blocking electrical power to reach the ignition system. These systems further included a limited access mechanism for selectively actuating the ignition control device to permit power to pass to the ignition. A common limited access mechanism included a keyboard located in the passenger compartment for the operator to punch in a preselected code. The ignition control device was wired to the keyboard to receive codes therefrom and respond to the preselected code by providing electrical power to the ignition. Improper codes often actuated an audio or visual alarm. In other prior art systems, the limited access mechanism included a concealed toggle switch, magnetic read switch, key switch, or the like.

One of the problems with the prior art systems was that it was necessary to cut and splice the ignition control device into the vehicle wiring system. Gaining access to and cutting the correct wires was often difficult, particularly for the do-it-yourselfer. Further, failure of the anti-theft system could cut off power to the ignition system causing the vehicle to become inoperative. Another problem with prior art systems was that they often required a wire to be run from the passenger compartment keyboard through the firewall to the ignition control device located under the hood.

The present invention contemplates a vehicular access control system which overcomes the above-referenced problems and others.

BRIEF DESCRIPTION OF THE INVENTION

In accordance with one aspect of the present invention, there is provided a controlled access battery. The battery includes a battery casing which defines a battery fluid receiving region in which an array of battery plates are received. One terminal of the battery plate array is connected directly with a battery terminal which is located on the exterior of the casing. The other electrical terminal of the battery plate array is connected with an access control circuit which is sealed in a battery fluid impermeable housing that is mounted within the battery casing. The control circuit is connected with a second battery terminal that is also mounted on the exterior of the housing. The access control circuit is selectively and remotely enabled and disabled to pass at least one selected level of current from the battery plate array to the second battery terminal.

In accordance with another aspect of the invention, there is provided a battery lock anti-theft system for motor vehicles. A tamper resistant housing is mounted to a battery casing such that at least one electric connection terminal of the battery is enclosed by the housing. An access control means for selectively passing at least one level of electric current is connected between the enclosed battery terminal and a controlled electrical connection terminal mounted on the housing.

In accordance with yet another aspect of the present invention, there is provided an access control system for motor vehicles which have an electrical system that includes at least a battery and a starter motor. A current limiting means which is electrically connected between the battery and the starter motor limits the flow of current therethrough to a first current level. The first current level is insufficient to operate the starter motor but sufficient to operate other portions of the electrical system which draw less current than the starter motor. A high level current passing means which is operatively connected between the battery and the starter motor selectively passes sufficient current to operate the starter motor, i.e. passes current at a second level in excess of the first current level. A current level selection circuit is selectively accessed to enable the high level current passing means and the current limiting means to pass sufficient current to operate the starter motor. In this manner, when the current level selection circuit permits only the first current level to be passed, the vehicles behaves as if the battery is dead or too low to start the vehicle. However, when the current level selection circuit enables the second level current to pass, the vehicle starts and operates normally.

One advantage of the present invention is that it is easy to install. It can be installed without cutting or splicing any wires of the vehicle wiring system.

Another advantage of the present invention is that it cannot be defeated by conventional hot wiring.

Yet other advantages of the present invention are that it is passive, it can be used in conjunction with other anti-theft devices, it fails safe, i.e. with the vehicle operative, and selected other electrical devices are permitted to function normally.

Still further advantages of the present invention will become apparent to those of ordinary skill in the art upon reading and understanding the following detailed description of the preferred embodiments.

BRIEF DESCRIPTION OF THE DRAWINGS

The invention may take form in various parts and arrangement of parts. The drawings are only for purposes of illustrating a preferred embodiment of the invention and are not to be construed as limiting it.

DETAILED DESCRIPTION OF THE PREFERRED AND ALTERNATE EMBODIMENTS

Figure 1:
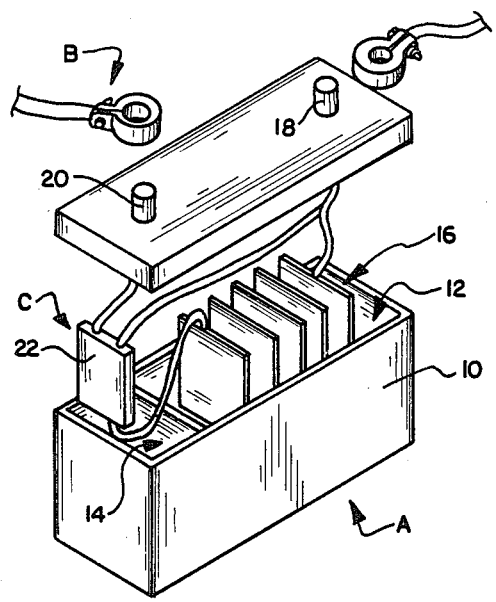
FIG. 1 is an exploded view of an access control system in conjunction with, particularly built-in to, a rechargeable battery in accordance with the present invention.
Figure 4:
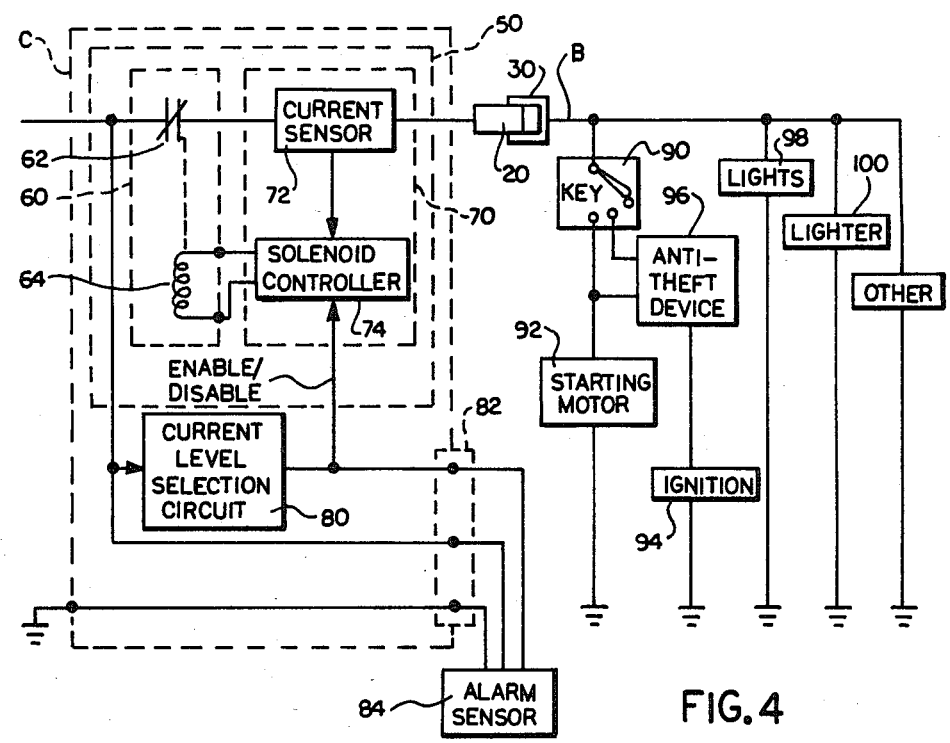
FIG. 4 is a circuit diagram of an access control system in accordance with the present invention in conjunction with an automotive wiring system.

With reference to FIGS. 1 and 4, vehicles commonly include a rechargeable battery A having positive and negative terminals. A vehicle wiring or electrical system B is selectively connected with the battery to supply power to various electrical devices. The present invention incorporates a control access circuit or system C which selectively controls the passage of electric power from the battery to the wiring system and the various electrical devices.

With particular reference to FIG. 1, the access control circuit C is mounted within a conventional rechargeable battery. Particularly, the battery A includes a battery casing 10 which defines a battery fluid or acid receiving region 12 and a fluid free access circuit receiving region 14. An array of battery plates 16 are disposed in the battery fluid receiving region. A negative end of the battery plate array is connected directly with a negative battery terminal 18. A positive end of the battery plate array is connected with the access control circuit C which in turn is connected with the positive battery terminal 20. The access control circuit C which selectively controls the level of current flow therethrough is encased in the battery acid proof housing 22.

Figure 2:
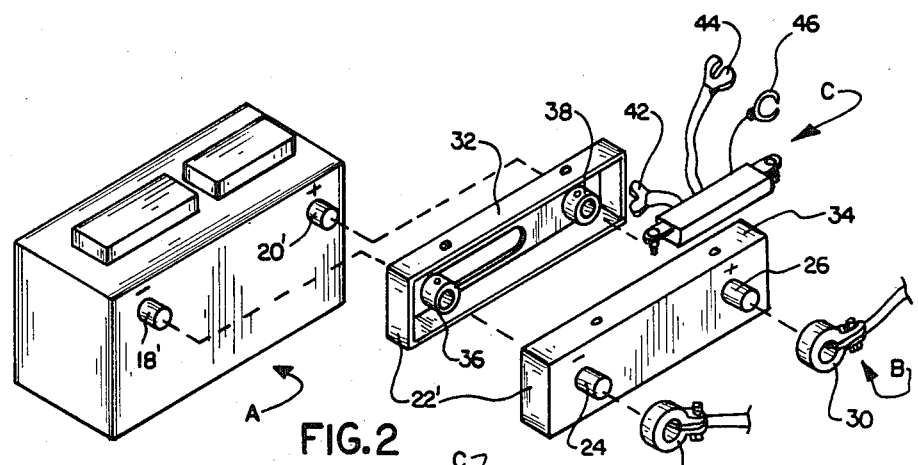
FIG. 2 is an exploded view of an access control system in conjunction with, particularly fastened onto, a conventional rechargeable battery in accordance with the present invention.

In the embodiment of FIG. 2, like elements with the embodiment of FIG. 1 are denoted by like reference numeral but followed by a prime ('). The control access system C is connected between a positive terminal 20' of the battery A and the wiring system B. The access control system includes a tamper resistant plastic housing 22' on which a pair of electric terminals 24, 26 are mounted. The housing terminals are of the same shape and configuration as the battery terminals for interconnection with standard battery connectors 28, 30 of the electrical wiring system B. In the illustrated embodiment, the housing 22' includes a pair of housing portions 32, 34 which are adapted to be connected together, e.g. by a plurality of sheet metal screws. The first housing portion 32 has a pair of battery terminal connectors 36, 38 which are dimensioned to be electrically and mechanically connected with the battery terminals 18', 20', e.g. be clamped therearound by said screws. At least one of the battery terminal connectors is adjustably, e.g. slidably, mounted in the first housing portion 32 to accommodate batteries with different arrangements and spacings of terminals. The access control circuit C is mounted in the housing and is electrically connected between one of the battery terminals and a corresponding housing terminal. Specifically, the access control circuit includes a pair of heavy leads 42, 44 which are connected with the positive battery and housing terminals. A lightweight ground lead 46 is connected with the negative battery terminal to provide a ground connection for electrical components of the access control circuit C. A direct connection or, optionally, a second access control circuit is provided between the negative battery terminal 18' and the negative housing terminal 24.

Figure 3:
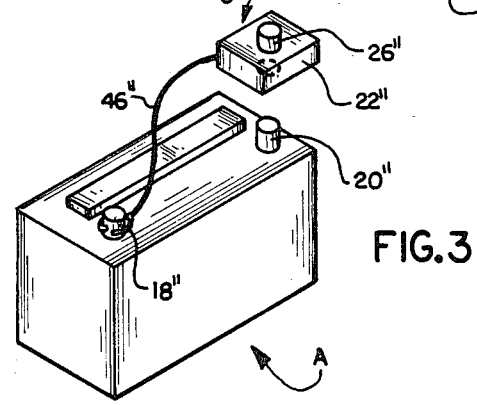
FIG. 3 is an alternate embodiment of an access control system in conjunction with a conventional battery.

In the embodiment of FIG. 3, like reference numerals are used to denote like elements but followed by a double prime ("). A housing 22" is dimensioned to be mechanically connected with the battery encompassing a battery positive terminals 20". An access control circuit mounted within the housing selectively passes electrical power from the positive battery terminal 20" to a housing terminal 26".

With reference to FIG. 4, the access control circuit C includes a current passing means 50 to selectively passing current of at least one selected level. More specific to the embodiment of FIG. 4, the current passing means selectively passes current of a preselected low or first current level which is too low to operate a conventional automotive starting motor and a second, high level which is sufficient to operate the starter motor. The current passing means includes a high level current passing means 60 for selectively passing the second, sufficiently high level of current to operate the starter motor. The high level current passing means includes a set of normally closed solenoid contacts 62 and a solenoid coil 64 for selectively opening and closing the solenoid contacts. In this manner, the high level current passing means selectively (a) passes current from the battery substantially unlimited and (b) prevents the passage of any current from the battery. The current passing means further includes a low current passing means or current limiting means 70 which selectively limits the current flow through the access control circuit to the first, preselected maximum current level. The current limiting means 70 includes a current sensor 72 for sensing the current level passing through the access control circuit C. In response to the sensed current level exceeding the first current level, a solenoid controller 74 actuates the solenoid coil 64 to open the normally closed solenoid contacts 62 stopping current flow. Subsequent to the termination of current flow, the current limiting means 70 deactivates the solenoid allowing the current passing means to recommence passing current. If the wiring system B attempts to draw more than the first current level, the current limiting means again causes the current flow to be interrupted. In this manner, the control access circuit passes a series of current pulses which are limited substantially to the preselected maximum current level.

A current level selection circuit or remotely controlled logic means 80 upon receipt of a preselected access code causes the current passing means to pass more than the first current level. More particularly to the embodiment of FIG. 4, it disables the current limiting means. In this manner, a proper access code defeats the current limiting means and allows the access control circuit to pass sufficient power to crank the starter motor. A three-pronged plug 82 is connected with the current selection circuit, the source of power, and ground. A conventional alarm system 84 may be plugged into the three-pronged plug. The power and ground wires provide operating power to the alarm system and the output from the current level selection means 80 disables the alarm in response to the access code. Absent being disabled by the access code, the alarm system functions in its normal manner to initiate an audible or visual alarm in response to motion, current draw, or other conditions as determined by the conventional alarm system.

Downstream from the access control circuit C, the automotive wiring system B includes a key operated switch 90 which selectively supplies electrical power to a starter motor 92 and an ignition 94. Optionally, a conventional automotive anti-theft device 96 may be interconnected between the key and the ignition or starter motor. The conventional anti-theft device 96 blocks the flow of power to the ignition system until it is enabled by the operator. Conventional anti-theft systems are enabled by the operator through the use of a fender mounted key, a digital keyboard in the passenger compartment, a hidden toggle switch, or the like. Other electrical devices which receive power through the automotive wiring B system include headlights, cigarette lighter, and the like.

Figure 5:
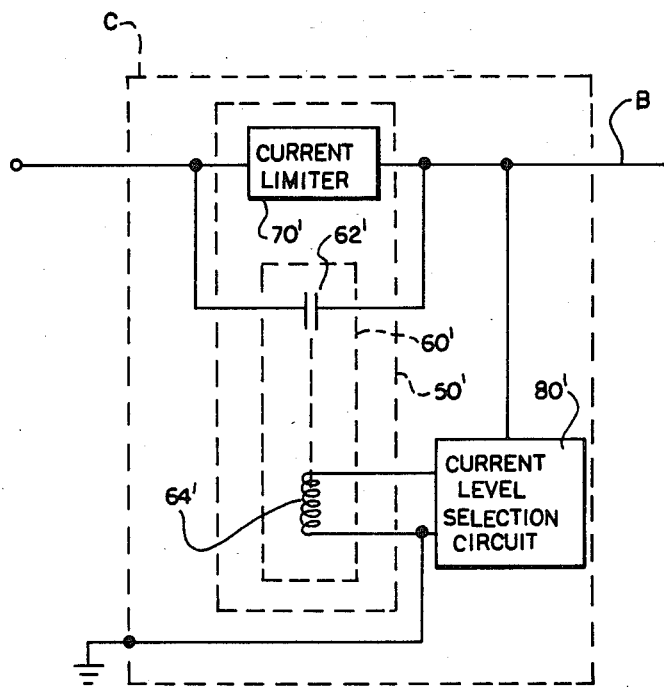
FIG. 5 is an alternative embodiment of the access control system of FIG. 4.

FIG. 5, illustrates an alternate embodiment of the access control system C in which like elements are designated by the same reference numeral as in the embodiment of FIG. 4 but followed by a prime ('). The access control circuit C includes a current passing means 50' for selectively passing current at one of a plurality of selected levels. In the illustrated embodiment, the passage of current is selectively (1) limited to the first, preselected maximum level and (2) a second level which is allowed to exceed the first current level. The first current level is selected to be high enough for the various electrical devices of the automobile to function normally but sufficiently low that insufficient current passes through to operate the starter motor. The second level is high enough to operate the starter motor. For some uses, the selected current levels may be (1) no current and (2) substantially unlimited current. The current passing means includes a current limiting means 70' which limits the amount of current passing therethrough to the first current level. In response to receiving a preselected access code or command, a current level selection circuit 80' causes a high level current passing circuit 70' to pass electric current in excess of the first current level. The current limiting means and the high level current passing means are connected in parallel. In this manner, the access code is required to start the vehicle. Once started, the vehicle will continue to operate normally, even if the access control system should fail.

Figure 6:
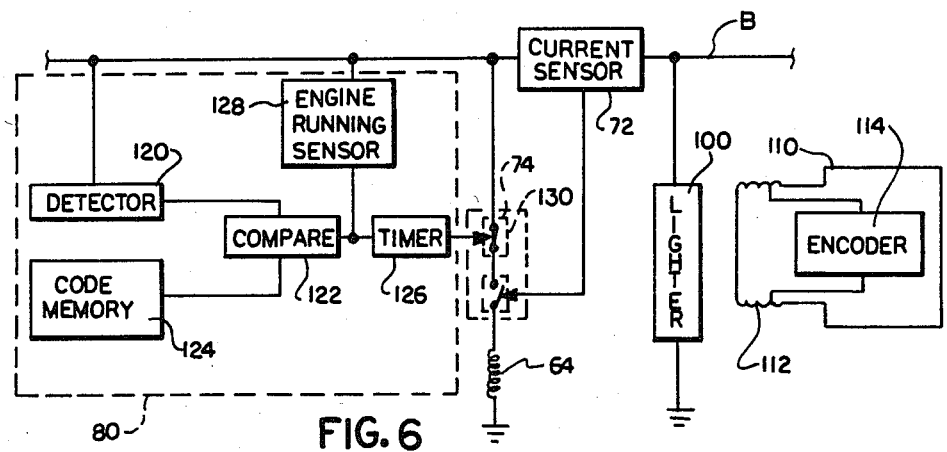
FIG. 6 is a circuit diagram of an access recognition and current level selection logic circuit of the access control system of FIGS. 4 or 5.

With reference to FIG. 6, the current level circuit 80 is responsive to an access code which is carried by the vehicular wiring system B. An operator carried element or electric key 110 has a plug or electrical contact portion 112 which is dimensioned for electrical interconnection with a socket portion of the wiring system which bypasses the ignition key, e.g. the cigarette lighter. A circuit chip 114 including an encoder is mounted in the operator element and electrically connected with the plug portion 112. In response to electric power from the lighter socket, the encoder produces a digitally encoded signal which it superimposes on the DC power in the wiring system B. A detector 120 detects the voltage variations in the wiring system B to produce an output signal which varies with the received digitally encoded signal. A comparing means 122 compares the digitally encoded signal from the detector 120 with a digitally encoded signal in a code memory means 124. In response to the received and stored encoded signals matching, a timing means 126 is initialized to produce an output signal for a preselected duration, e.g. one minute. The timer output causes the current passing means 50 to pass for the preselected duration sufficient current to operate the starter motor. An engine running sensor 128 is also connected to the input of the timing means 126 to hold the timing means initialized when the engine is running. When the engine is turned off, the timer holds the current passing means 50 in the high level current passing state for the preselected duration.

The engine running sensor in the preferred embodiment senses the voltage at the battery terminal. A conventional engine charging system delivers a charging voltage to the battery of at least 14 volts. Whereas when the engine is off, the battery produces a voltage of less than thirteen volts. Thus, by sensing the voltage at the battery terminal, the engine running sensor 128 can determine whether the engine charging system is operating, hence whether the engine is running. More specific to the embodiment of FIG. 4, the timing means 126 opens a normally closed switch 130 in the solenoid control means 74 which prevents current from flowing to the solenoid coil 64.

Figure 7:
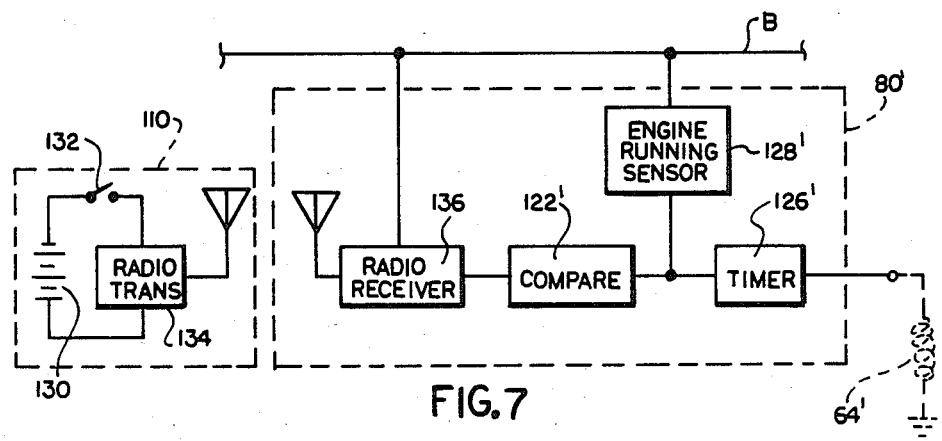
FIG. 7 is an alternate embodiment of the logic circuit of FIG. 6.

In FIG. 7, like elements with the embodiment of FIG. 6 are denoted by like reference numeral but followed by a prime ('). An operator access element 110' includes a battery 130, an operator actuated switch 132, and a radio transmitter 134 for transmitting a preselected access code radio signal. The access control circuit includes a radio receiver 136 for receiving the transmitted radio signal. A comparing means 122' determines whether or not the received radio transmission carried the preselected access code. In response to the preselected code, the comparing means enables a timing means 126' which provides an output signal for a preselected duration. An engine running sensor 128' maintains the timing means in its initialized position such that the timer produces the output signal (1) for the preselected duration after receipt of the access code, (2) while the engine is running, and (3) for the preselected duration after the engine is shut-off.

Figure 8:
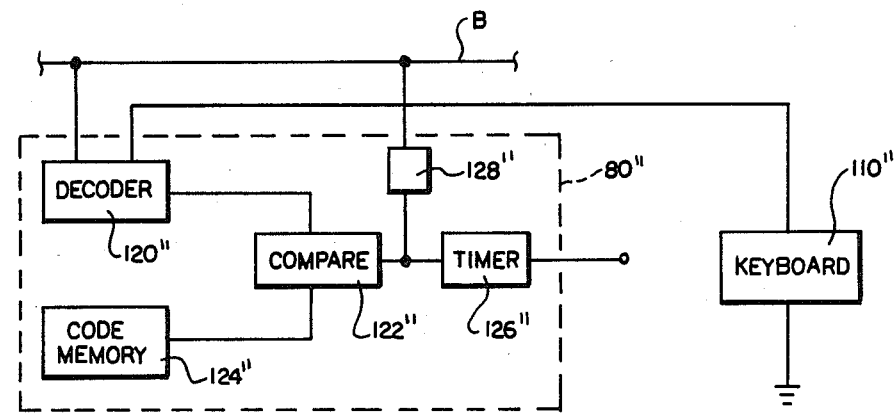
FIG. 8 is yet another alternate embodiment of the logic circuit of FIG. 6.

In the embodiment of FIG. 8, like elements with the embodiments of FIGS. 6 and 7 are denoted by like reference numerals but followed by a double prime ("). An operator keyboard 110" is mounted in the passenger compartment for the operator to enter a preselected code. The keyboard is connected by a dedicated wire with a decoding means 120". A comparing means 122" compares the received code with the code from a code memory 124". A timing means 126" is enabled in response to receipt of the access code and by an engine running sensor 128".

The invention has been described with reference to the preferred embodiments. Obviously, modifications and alterations will become apparent to others upon reading and understanding the preceding detailed description. It is intended that the invention be construed as including all such alterations and modifications insofar as they come within the scope of the appended claims or the equivalents thereof.

Having thus described a preferred embodiment of the invention, the invention is now claimed to be:

1. An access control system for a vehicle having an electrical system including a battery and a starter motor, the access control system comprising:

current passing means for selectively passing current limited to a first, preselected current level which is insufficient to operate the starter motor, and current of a second current level which is sufficient current to operate the starter motor, the first current level being sufficiently high to operate vehicle electrical devices which draw less current than the lstarter motor unimpaired, the current passing means being connected electrically between the battery and the starter motor;

current level selection means for selectively enabling the current passing means to pass one of the first and second current levels, the current level selection means including means for determining whether a received access control signal includes a preselected access code and timing means, the access code determining means and the timing means being operatively connected with the current passing means for enabling the current passing means to pass current of the second current level for a preselected duration in response to receiving the preselected access code, whereby when the current passing means is enabled, the vehicle operates normally and, when the current passing means is disabled, the vehicle operates as if it has a low battery.

2. The access control system as set forth in claim 1 wherein the current passing means includes a high level current passing means for passing current of the second current level and a current limiting means for limiting passed current to said first current level, the high level current passing means and the current limiting means being operatively connected between the battery and the starter motor.

3. An access control for a vehicle having an electrical system including a battery and a starter motor, the access control system comprising:
   (a) current passing means for selectively passing current limited to a first, preselected current level which is insufficient to operate the starter motor and current of a second current level which is sufficient current to operate the starter motor, the first current level being sufficiently high to operate vehicle electrical devices which draw less current than the starter motor, the current passing means including:
      (1) a normally closed switch means for passing current of the second level between the battery and the starter motor, whereby the starter motor is normally able to draw sufficient current to operate, and
      (2) a current limiting means for limiting current passed to the starter motor generally to the first current level, the current limiting means including:
         (i) a current sensor for sensing current passed to the starter motor, and
         (ii) means for opening the normally closed switch means in response to the sensed current exceeding the first current level, whereby the passage of current to the starter motor through the normally closed switch means is stopped in response to the passed current exceeding the first current level, and then allowing the normally closed switch means to close after the current level has dropped below the first current level,
   the current passing means being connected electrically between the battery and the starter motor;
   (b) current level selection means for selective enabling the current passing means to pass one of the first and second current levels, the current level selection means selectively enables and disables the current limiting means from opening the normally closed switch, whereby when the current passing means is enabled, the vehicle operates normally and, when the current passing means is disabled, the vehicle operates as if it has a low battery.

4. The access control system as set forth in claim 2 wherein the high level current passing means includes a normally open switch means connected in parallel with the current limiting means and wherein the current level selection means selectively opens and closes the normally open switch means to select the first and second current levels, respectively.

5. An access control system for a vehicle having an electrical system including a battery and a starter motor, the access control system comprising:
   a tamper resistant housing which is configured to be mounted to the battery enclosing at least one battery terminal,
   means for securely mounting the housing to the battery,
   a housing electrical terminal mounted on the exterior of the housing for selective electrical interconnection with the starter motor,
   a current passing means being mounted within the housing and being electrically connected between the battery terminal and the housing terminal, the current passing means selectively passing current limited to a first, preselected current level which is insufficient to operate the starter motor and current of a second current level which is sufficient current to operate the starter motor, the first current level being sufficiently high to operate vehicle electrical devices which draw less current than the starter motor, such that the current passing means selectively passes current of the first and second levels between the battery terminal and the housing terminal, and,
   a current level selection means for selectively enabling the current passing means to pass one of the first and second current levels, the current level selection means being mounted within the tamper resistant housing, whereby when the current passing means is enabled, the vehicle operates normally and, when the current passing means is disabled, the vehicle operates as if it has a low battery.

6. The access control system as set forth in claim 5 wherein the current level selection means includes a detecting means operatively connected with the vehicle electrical system to detect superimposed digitally encoded signals superimposed thereon and comparing means for comparing detected digitally encoded signals with a preselected access code, the comparing means being operatively connected with the current passing means for enabling the second current level to be passed in response to the preselected access code.

7. The access control system as set forth in claim 6 wherein the current level selecting means further includes an engine running sensing means for sensing whether the engine is running and a timing means operatively connected with the comparing means and the engine running sensing means, the timing means being operatively connected with the current passing means for causing the current passing means to pass current of the second current level for a preselected duration after the comparing means receives the preselected access code and after the engine stops running.

8. The access control system as set forth in claim 5 wherein the current level selection means includes a radio receiver, a comparing means for comparing received radio signals with a preselected access code, engine running sensing means for sensing whether a vehicle engine is running, a timing means operatively connected with the engine running sensing means and the comparing means for enabling the current passing means to pass current of the second level for a preselected duration following receipt of the preselected access code and after the engine stops running.

9. An access control system for a vehicle having an electrical system including a starter motor, the access control system comprising:
- a battery that includes a battery casing which defines a battery fluid receiving reservoir, a pair of battery terminals, an array of battery plates disposed in the battery fluid reservoir and electrically connected with one of the battery terminals,
- a current passing means for selectively passing current limited to a first, preselected current level which is insufficient to operate the starter motor and current of a second current level which is sufficient current to operate the starter motor, the first current level being sufficiently high to operate vehicle electrical devices which draw less current than the starter motor, the current passing means being sealed within the battery casing and electrically connected between the array of battery plates and the other battery terminal,
- a current level selection means for selectively enabling the current passing means to pass one of the first and second current levels, the current level selection means being sealed within the battery casing, whereby when the current passing means is enabled, the battery selectively provides current at the second current level and the vehicle operates normally and, when the current passing means is disabled, the battery passes current at the first current level and the vehicle operates as if it has a low battery.

10. A battery comprising:
- a sealed battery casing which defines a battery fluid receiving reservoir;
- first and second battery terminals mounted on the exterior of the battery casing;
- an array of battery plates disposed in the battery fluid reservoir and electrically connected with the first battery terminal;
- a current passing means for selectively passing electric current, the current passing means being disposed in the battery casing and operatively connected between the battery plate array and the second battery terminal; and,
- current selection means for selectively enabling the current passing means to pass current to the second battery terminal, the current selection means being disposed in the battery casing and being operatively connected with the current passing means, the current selection means including comparing means for comparing a received signal with a preselected access code, the comparing means being operatively connected with the current passing means for enabling the current passing means to pass current in response to receiving the preselected code.

11. The battery as set forth in claim 10 wherein the current selection means further includes a detector operatively connected with the second battery terminal for receiving digitally encoded signals received thereby, the detector being operatively connected with the comparing means.

12. The battery as set forth in claim 10 wherein the current selection means includes a radio receiver for receiving encoded radio signals, the radio receiver being operatively connected with the comparing means.

13. The battery as set forth in claim 10 wherein the current passing means includes a current limiting means for limiting current passing therethrough to a first, preselected level and high level current passing means for selectively passing current therethrough at a second level in excess of said first current level, the current limiting means and the high level current passing means being operatively connected between the battery plate array and the second battery terminal such that current is passable therebetween at one of the first and second currents levels.

14. The battery as set forth in claim 13 wherein the high level current passing means includes a switch means connected in parallel with the current limiting means for selectively bypassing current therearound, the switch means being operatively connected with the current selection means.

15. The battery as set forth in claim 13 wherein the high level current passing means includes a switching means for selectively passing current of the second level between the battery plate array and the second terminal and wherein the current limiting means includes current sensing means for sensing the magnitude of current passing therethrough and switching control means for selectively blocking the switching means from passing current therethrough in response to the current sensing means detecting current in access of the first current level, the current limiting means being operatively connected with the current selection means for being enabled and disabled thereby.

16. An access control system for a vehicle having an electrical system including a battery and a starter motor, the access control system comprising:
- a tamper-resistant housing;
- housing mounting means for mounting the housing to the battery such that at least one battery terminal is enclosed in the housing;
- a housing terminal of substantially the same configuration as the battery terminal mounted on the exterior of the housing such that the vehicle electrical system is adapted to be connected with the housing terminal;
- current passing means for selectively passing electric current, the current passing means being disposed in the housing and operatively connected between the battery terminal and the housing terminal for selectively passing electric current therebetween; and,
- current level selection means for selectively enabling the current passing means to pass current, the current level selection means being disposed in the housing and operatively connected with the current passing means, the current level selection means including comparing means for comparing a received code with a preselected access code and a timing means operatively connected with the comparing means for enabling the current passing means for a preselected duration in response to receiving the preselected access code.

17. The access control system as set forth in claim 16 wherein the current level selection means further includes an engine running sensing means for sensing whether an automotive engine is running, the engine running sensing means being operatively connected with the timing means for causing the timing means to enable the current passing means for the preselected duration in response to the engine being stopped.

18. An access control system for a vehicle having an electrical system including a battery and a starter motor, the access control system comprising:
- a tamper-resistant housing;

housing mounting means for mounting the housing to the battery such that at least one battery terminal is enclosed in the housing;

a housing terminal of substantially the same configuration as the battery terminal mounted on the exterior of the housing such that the vehicle electrical system is adapted to be connected with the housing terminal;

current passing means for selectively passing electric current, the current passing means being disposed in the housing and operatively connected between the battery terminal, the current passing means includes a current limiting means for limiting the level of current passing therethrough to a first level which is insufficient to operate the starter motor and high level current passing means for passing current therethrough at a level which is sufficiently high to operate the starter motor, the current limiting means and the current passing means being disposed in the housing and operatively connected between the battery terminal and the housing terminal for selectively passing electric current therebetween, current level selection means for selectively enabling the current passing means to pass current, the current level selecting means disposed in the housing and operatively connected with the current limiting means and high level current passing means such that the current level selecting means selectively enables current to be passed.

* * * * *